United States Patent
Kawamura

(10) Patent No.: US 8,414,033 B2
(45) Date of Patent: Apr. 9, 2013

(54) PIPE JOINT AND PIPE EQUIPPED WITH PIPE JOINT

(75) Inventor: Hirokazu Kawamura, Hashima (JP)

(73) Assignees: Mirai Industry Co., Ltd., Gifu (JP); Tosetz Co., Ltd., Tokyo (JP)

( * ) Notice: Subject to any disclaimer, the term of this patent is extended or adjusted under 35 U.S.C. 154(b) by 0 days.

(21) Appl. No.: 13/397,976

(22) Filed: Feb. 16, 2012

(65) Prior Publication Data

US 2012/0139234 A1   Jun. 7, 2012

Related U.S. Application Data

(63) Continuation of application No. PCT/JP2010/004694, filed on Jul. 22, 2010.

(30) Foreign Application Priority Data

| Aug. 20, 2009 | (JP) | ................................. 2009-190781 |
| Nov. 9, 2009 | (WO) | .................. PCT/JP2009/069058 |
| Jun. 17, 2010 | (JP) | ................................. 2010-138059 |

(51) Int. Cl.
   *F16L 17/00*   (2006.01)

(52) U.S. Cl.
   USPC ......................................... 285/377; 285/110

(58) Field of Classification Search .................. 285/377, 285/400, 307, 308, 95, 110, 108, 315, 39
   See application file for complete search history.

(56) References Cited

U.S. PATENT DOCUMENTS

| 549,419 | A | * | 11/1895 | Wright | ........................... 277/553 |
| 788,600 | A | * | 5/1905 | Rogers | ............................. 285/89 |
| 1,868,119 | A | * | 7/1932 | Segelhorst | ............... 285/123.11 |
| 1,888,539 | A | * | 11/1932 | Otterson | ........................ 285/108 |
| 2,129,704 | A | * | 9/1938 | Meyer | .............................. 285/33 |
| 2,146,641 | A | * | 2/1939 | McWane | ........................ 277/625 |
| 2,702,202 | A | * | 2/1955 | Kaiser | .............................. 285/18 |
| 2,914,345 | A | * | 11/1959 | Osborn | .......................... 285/110 |

(Continued)

FOREIGN PATENT DOCUMENTS

| JP | 63-231086 A | 9/1988 |
| JP | 11173473 A | 6/1999 |
| JP | 2002-286182 A | 10/2002 |
| JP | 2008-180371 A | 8/2008 |

OTHER PUBLICATIONS

ISR for PCT/JP2010/004694, Dated Aug. 17, 2010.

*Primary Examiner* — Aaron Dunwoody

(74) *Attorney, Agent, or Firm* — Trego, Hines & Ladenheim, PLLC

(57) ABSTRACT

A pipe joint includes: a joint main body with a receiving opening for a pipe; an axially-movable tube-shaped body mounted to the receiving opening; and a retaining ring closely arranged to an outer surface of the pipe for preventing the pipe from detaching, wherein the joint main body includes a receiving portion for receiving the retaining ring, and a tapered portion for radially shrinking the retaining ring, wherein the tube-shaped body is arranged to move between a first position where the retaining ring is allowed to move into the tapered portion, and a second position where the retaining ring is blocked from tapered portion, and wherein the pipe joint is configured such that the pipe can be inserted into the receiving opening when the tube-shaped body is either position, that in the first position the pipe is not detachable, and that in the second position the pipe is detachable.

8 Claims, 7 Drawing Sheets

U.S. PATENT DOCUMENTS

| | | | | |
|---|---|---|---|---|
| 2,973,211 A * | 2/1961 | Osborn | | 285/104 |
| 3,064,983 A * | 11/1962 | Halterman | | 277/604 |
| 3,480,302 A * | 11/1969 | Teague et al. | | 285/362 |
| 3,731,955 A * | 5/1973 | Borsum et al. | | 285/111 |
| 4,298,220 A * | 11/1981 | Kukuminato | | 285/148.26 |
| 4,540,201 A * | 9/1985 | Richardson | | 285/101 |
| 4,951,975 A * | 8/1990 | Bartholomew | | 285/111 |
| 5,000,491 A * | 3/1991 | Bartholomew | | 285/319 |
| 5,024,468 A * | 6/1991 | Burge | | 285/39 |
| 5,052,723 A * | 10/1991 | Bartholomew | | 285/108 |
| 5,160,175 A * | 11/1992 | Yang | | 285/104 |
| 5,232,252 A * | 8/1993 | Bartholomew | | 285/108 |
| 5,324,083 A * | 6/1994 | Vogelsang | | 285/110 |
| 6,908,120 B2 * | 6/2005 | Tomita et al. | | 285/306 |
| 6,988,747 B2 * | 1/2006 | Allen et al. | | 285/322 |
| 7,475,913 B2 * | 1/2009 | Muto | | 285/39 |
| 8,052,177 B2 * | 11/2011 | Irwin | | 285/377 |
| 2004/0094950 A1 * | 5/2004 | Ko | | 285/39 |
| 2005/0242571 A1 * | 11/2005 | Houghton et al. | | 285/110 |
| 2005/0285394 A1 * | 12/2005 | Muto | | 285/307 |
| 2009/0152866 A1 * | 6/2009 | Mutschlechner et al. | | 285/377 |
| 2010/0164222 A1 * | 7/2010 | Schreckenberg et al. | | 285/24 |

* cited by examiner

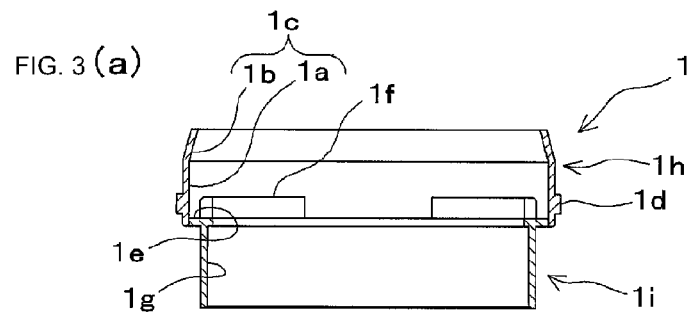
FIG. 3(a)
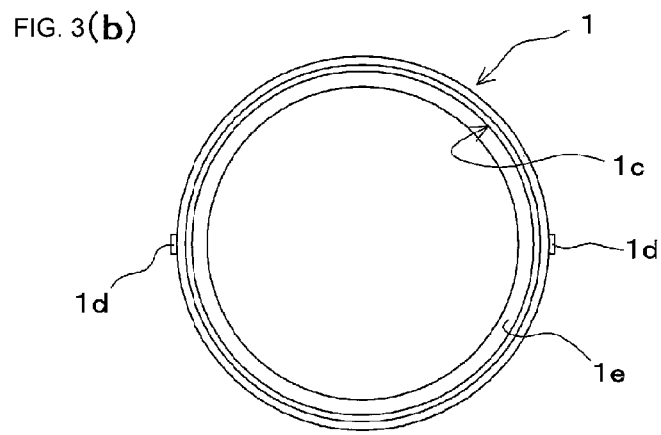
FIG. 3(b)
FIG. 3(c)
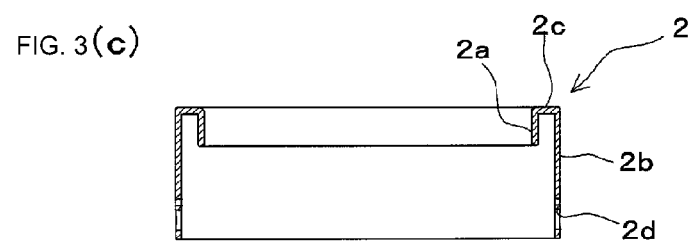
FIG. 3(d)
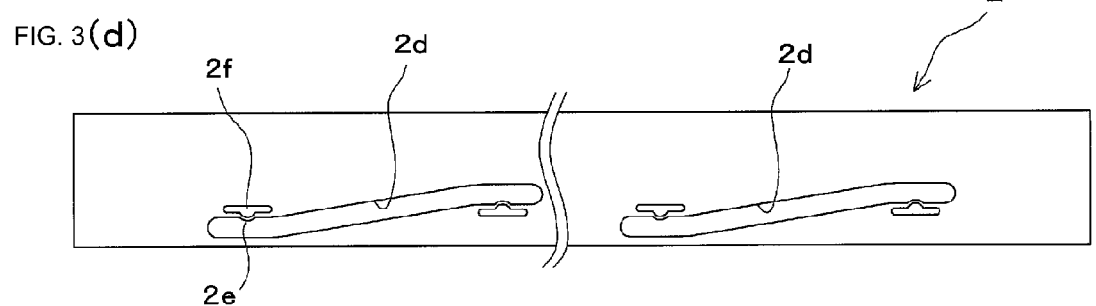
FIG. 3(e)
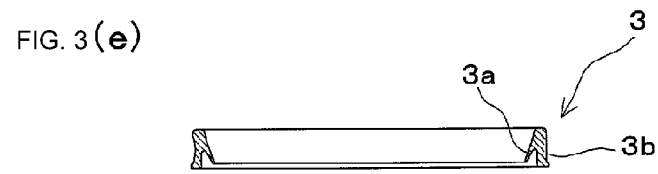

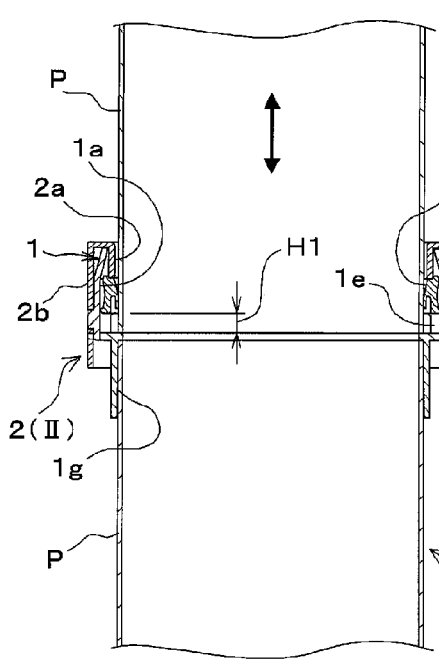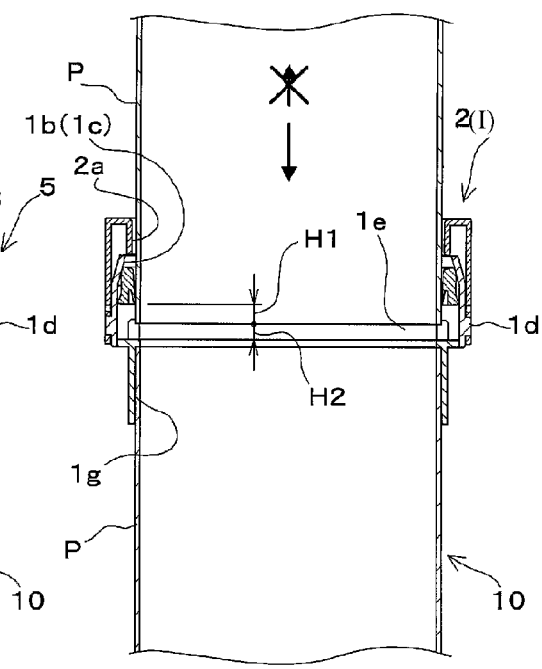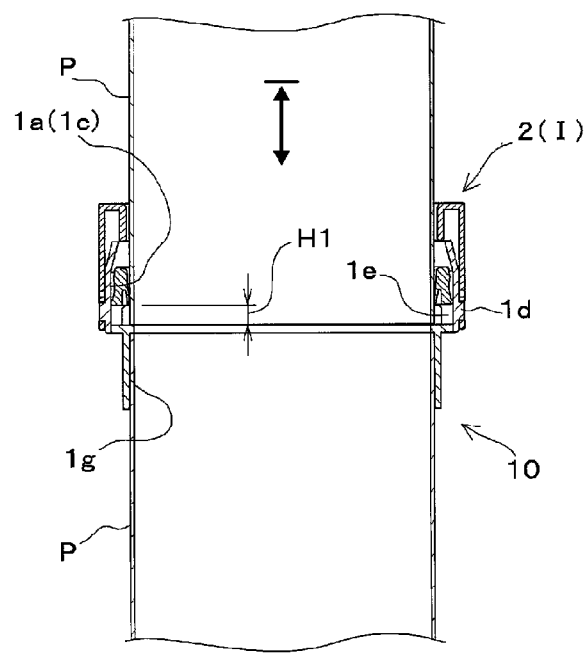

PIPE JOINT AND PIPE EQUIPPED WITH PIPE JOINT

CROSS-REFERENCE TO RELATED APPLICATIONS

This application is a Continuation of Application PCT/JP2010/004694, filed Jul. 22, 2010, which is currently pending.

BACKGROUND OF THE INVENTION

1. Field of the Invention

The present invention relates to a pipe joint for connecting pipes and a pipe equipped with the pipe joint.

2. Background Art

A pipe is generally used for transporting fluid such as gas or water. It is here often necessary, regardless of the material of the pipe, to connect multiple pipes by means of pipe joints, for example in the case that a provided pipe is limited in length for forming a pipe channel. In such a case, a pipe may be desired to able to be inserted into, detached from and retained from being detached from the pipe joint, if necessary.

As this type of pipe joints, many have been proposed. One example is disclosed in Publication of Japanese Unexamined Patent Application No. H11-173473 (hereinafter "the '473 Publication", where simple detachment of the pipe is possible.

As seen in FIGS. 2 and 3, the pipe joint described in the '473 Publication is provided with a pipe joint main body (1) receiving a retaining ring (2), where pores (4,5) are provided on the external wall of the pipe joint main body (1). By inserting and operating a driver into the pores (4,5) the pipe can be detached. Here, a tool like a driver is necessary for detachment. (The reference numerals in parenthesis are those used in the '473 Publication.)

The present invention is provided to solve the above-mentioned problem, more specifically, to provide a pipe joint and a pipe equipped with a pipe joint, where the pipe can be inserted, detached and retained from being detached by simply operating the pipe joint itself without requiring a separate tool or the like.

BRIEF SUMMARY OF THE INVENTION

The pipe joint of the present invention includes a joint main body provided with a receiving opening into which a pipe is inserted; a tube-shaped body mounted to said receiving opening and movably in the axial direction of said joint main body; and a retaining ring being closely arranged to an outer surface of the pipe inserted into the receiving opening for preventing the pipe from being detached from said receiving opening by radial shrinkage, where said joint main body is composed of a receiving portion for receiving said retaining ring and a tapered portion for radially shrinking said retaining ring when said retaining ring is moved toward a tip side of said receiving portion, where said tube-shaped body is provided with an inner cylinder inserted into an inner surface of the receiving opening, and is arranged to move reciprocatively between a first position where said retaining ring is allowed to move into said tapered portion without said inner cylinder projecting into said tapered portion, and a second position where said retaining ring is prevented from moving into said tapered portion as a peripheral end of said inner cylinder projects into said tapered portion, and where said pipe joint is configured so as that the pipe can be inserted into said receiving opening when said tube-shaped body is both in the first and the second position, that in said first position said retaining ring moves together with the pipe into said tapered portion for preventing the pipe from being detached, and that in said second position the pipe is allowed to be detached without said retaining ring moving into said tapered portion. Therefore, the pipe can be inserted, detached and retained from being detached by simply operating the pipe joint itself without requiring a separate tool or the like.

With the pipe joint of the present invention, the joint main body is provided with a ring catching part residing in a remote end of said receiving portion and confining the movement of said retaining ring together with the pipe, and a pipe-end stopping part residing more remotely than said ring catching part and abutting on the pipe end when the pipe is inserted, where said retaining ring is positioned at a position away from the pipe end with a distance corresponding to a length of said ring catching part when the pipe is inserted. Said retaining ring thus can be assured to be closely arranged to the outer periphery of the pipe, resulting in the assured connection of the retaining ring and the pipe.

With the pipe joint of the present invention, the joint main body is composed of a transparent or a semi-transparent material at least between said pipe-end stopping part and said ring catching part so as to be able to recognize an inserted pipe from the outside, so that it is confirmed from the outside that the pipe end is contacted with the pipe-end stopping part.

With the pipe joint of the present invention, said retaining ring can be a rubber seal ring. In this case, a fluid sealing effect can be exerted.

With the pipe joint of the present invention, a lubricant can be applied or attached to a portion of the outer periphery of said retaining ring which is contacted with an inner periphery of said joint main body and/or to a portion of the inner periphery of the joint main body which is contacted with the outer periphery of said retaining ring so as to improve a smooth sliding of the joint main body relative to the retaining ring. Thus said retaining ring is assured to move within the joint main body following the movement of the pipe, prevents the pipe from being detached when it is within the tapered portion, and not to confine the pipe in the receiving portion.

With the pipe joint of the present invention, said joint main body and said tube-shaped body are configured to be engaged by way of a convex engaging part and an engagement slot, where said engagement slot guides said tube-shaped body so as to move said tube-shaped body in the axial direction of said joint main body by rotating said tube-shaped body in the circumferential direction. In that case, the tube-shaped body can be moved between the first position and the second position by a simple rotating operation of the tube-shaped body.

A pipe equipped with a pipe joint of the present invention includes the above-mentioned pipe joint and a pipe with a predetermined length connected to an opposite side to the tube-shaped side. Thereby, in forming a pipe channel on site, an effort of fixedly joining one pipe can be saved.

BRIEF DESCRIPTION OF THE DRAWINGS

The invention may be best understood by reference to the following description taken in conjunction with the accompanying drawing figures in which:

FIG. 1(*b*) is a plan view showing the example;

FIG. 1(*c*) is a right side view showing the example;

FIG. 1(d) is a cross-sectional view along the line A-A of FIG. 1(b);

FIG. 3(a) is a cross-sectional view of the joint main body of FIG. 1;

FIG. 3(b) is a top view of the joint main body shown in FIG. 3(a);

FIG. 3(c) is a longitudinal cross-sectional view of the tube-shaped body of FIG. 1;

FIG. 3(d) is a development view of an outer periphery of the tube-shaped body shown in FIG. 3(c);

FIG. 3(e) is a longitudinal cross-sectional view of the retaining ring of FIG. 1;

FIGS. 4(a), 4(b) and 4(c) show various embodiments of use of the pipe joint of FIG. 1 in longitudinal cross-sectional views;

DETAILED DESCRIPTION OF THE INVENTION

Embodiments of the present invention will be described below in reference to the drawings.

Embodiment 1

Figure 1:
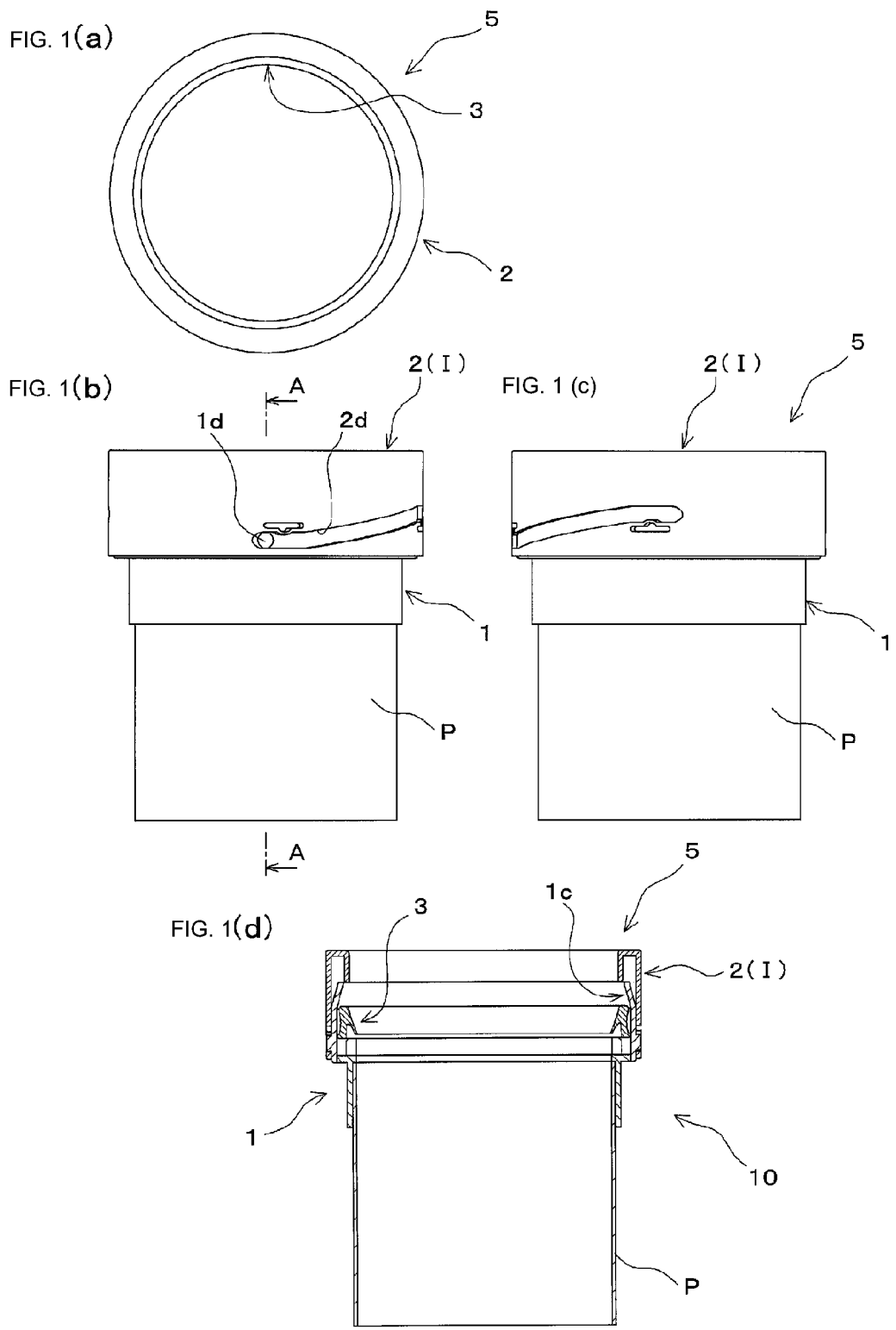
FIG. 1(*a*) is a top view showing an example of a pipe joint of the present invention.

FIG. 1 shows an example of a pipe joint of the present invention; (a) is a top view; (b) is a plan view; (c) is a right side view; and (d) is a cross-sectional view along the line A-A of the pipe joint.

The pipe joint 5 is fixedly joined to an end of a pipe P at one end, and detachably connected to another pipe at the other end, where the pipe can be retained from being detached. It is provided with a joint main body 1 having a receiving opening 1c into which the pipe can be inserted, a tube-shaped body 2 mountable to the receiving opening 1c movably in the axial direction of the joint main body 1, and a retaining ring 3 being closely arranged to the outer surface of the pipe inserted into the receiving opening 1c and preventing the pipe from being detached from the receiving opening 1c by shrinking radially.

As shown in FIG. 1(d), a pipe P with a predetermined length fixedly joined to the pipe joint 5 is called as a pipe equipped with the pipe joint 10. The pipe joint 5 and the pipe equipped with the pipe joint 10 are primarily used for ventilation channel, but are not limited to this use. Though a material for the pipe P is preferably polyvinyl chloride (PVC), it is not limited to PVC, and any other materials such as synthetic resins and metals having good weatherability, durability and formability may be used. The pipe P may be a corrugated pipe or a square pipe in shape.

Figure 2:
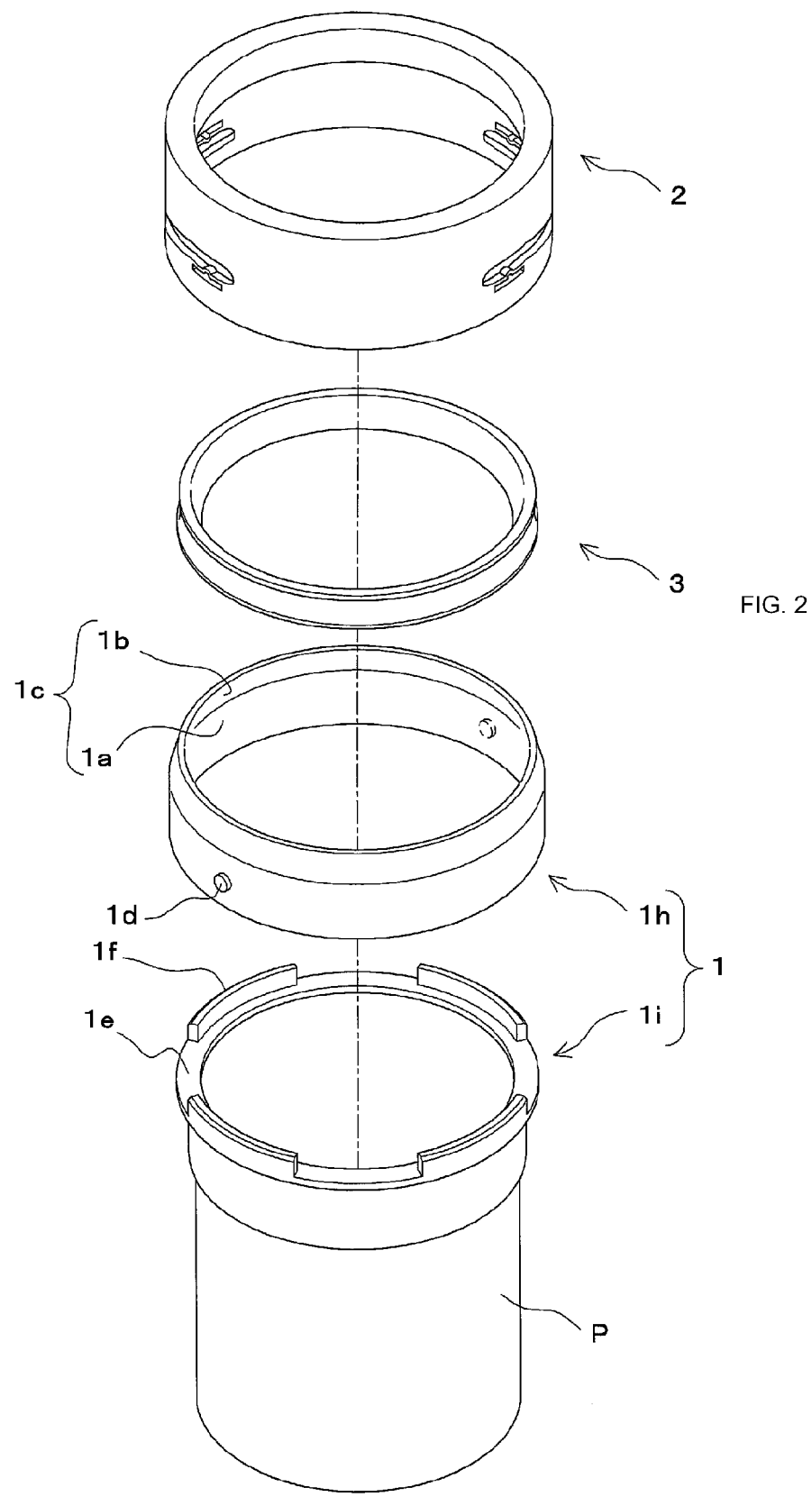
FIG. 2 is an exploded perspective view of the pipe joint shown in FIG. 1(a) through FIG. 1(d)

FIG. 2 is an exploded perspective view of the pipe joint of FIG. 1. FIG. 3(a) is a cross-sectional view of the joint main body of FIG. 1; FIG. 3(b) is a top view of FIG. 3(a); FIG. 3(c) is a longitudinal cross-sectional view of the tube-shaped body of FIG. 1; FIG. 3(d) is a development view of the outer periphery of the tube-shaped body of FIG. 3(c); FIG. 3(e) is a longitudinal cross-sectional view of the retaining ring of FIG. 1. Hereinafter, elements having been described once will be designated with the same reference numerals and will not be described any more.

Now, in reference to FIGS. 2 and 3 in combination with FIG. 1, each element of the pipe joint 5 will be explained more in detail.

First, in reference to FIG. 2, the joint main body 1 having several blocks will be described. The joint main body 1 is cylindrical in shape, and composed of a main-body outer part 1h and a main-body inner part 1i. The main-body outer part 1h includes in its inner periphery a receiving portion 1a receiving the retaining ring 3, and a tapered portion 1b residing at a tip side of the receiving portion 1a and shrinking radially the retaining ring 3 when the retaining ring 3 is moved into this portion. The main-body inner part 1i, on the other hand, includes a pipe-end stopping part 1e abutting on the pipe end when the latter is inserted, and a ring catching part 1f which partially projects from the outer periphery of the pipe-end stopping part 1e in the direction of the receiving portion 1a and confines the movement of the retaining ring 3 with the pipe P.

The main-body outer part 1h is coincided with the outer periphery of the main-body inner part 1i, more specifically, a side-tube end of the receiving portion 1a of the main-body outer part 1h is coincided with the outer periphery of the pipe-end stopping part 1e and fixedly joined with it so as to form a joint main body 1. The main-body outer part 1h may be formed with a transparent or a semi-transparent material, and in this case, when the tube is inserted up to the pipe-end stopping part 1e, it is possible to visually confirm through an engaging slot 2d of the tube-shaped body 2 explained below at a position except at the ring catching part 1f that the tube end lies on the pipe-end stopping part 1e.

Though a material of the main-body outer part 1h is preferably polyethylene terephthalate (PET), it is not limited to the material as far as it is a synthetic resin having good weatherability, durability and formability. Though a material of the main-body inner part 1i is preferably polyethylene terephthalate (PET), it is not limited to the material as far as it is a synthetic resin having good weatherability, durability and formability.

These two parts may be molded as a single-piece, where the main-body outer part can be made to be transparent or semi-transparent at least at a position corresponding to the position between said pipe-end stopping part and said ring catching part by way of so-called two color molding so that an inserted pipe can be recognized visually from the outside there.

The construction of the joint main body is not limited to that mentioned above as far as it is equipped with a ring catching part positioned in a remote end of the receiving portion and preventing the retaining ring from moving together with the pipe, and a pipe-end stopping part positioned at a more remote position than the ring-end catching part and abutting on the pipe end when the pipe is inserted, where said retaining ring is positioned at a position away from the pipe end with a distance corresponding to a length of said ring catching part when the pipe is inserted.

As shown in FIGS. 3(a) and (b), the joint main body 1 generally has a shape of a stepped cylinder, and includes said receiving portion 1a and said tapered portion 1b, which combinedly form a receiving opening 1c.

The joint main body 1 further includes a pair of convex engaging parts 1d, which are projections in round shape arranged opposite each other on the outer periphery of the receiving portion 1a, said pipe-end stopping part 1e forming the bottom of the receiving opening 1c and a cylindrical pipe junction part 1g extending from the pipe-end stopping part 1e in the direction opposite to the receiving opening 1c.

One pipe P is fixedly joined to the inner periphery of the pipe junction part 1g. The inner diameter of the pipe-end stopping part 1e is equal to or slightly greater than the inner diameter of the pipe P, and is smaller than the outer diameter of the pipe P. The pipe end of the pipe P abuts on the rear surface of the pipe-end stopping part 1e, where the inner periphery of the pipe-end stopping part 1e does not protrude in the radially inner direction from the inner periphery of the pipe P, so that the pipe-end stopping part does not disturb the fluid to be transported.

The tube-shaped body 2 is provided with an inner cylinder 2a to be inserted into the inner surface of the receiving opening 1c, an outer cylinder 2b covering the outside of the receiving opening 1c of the joint main body 1, a connecting part 2c which connects the two cylinders 2a and 2b so as to form a double cylinder.

The tube-shaped body 2 is arranged to move reciprocatively between a first position I where the retaining ring 3 is allowed to move relative to the joint main body 1 and to move into the tapered portion 1b without the inner cylinder 2a projecting into the tapered portion 1b, and the second position II where the retaining ring 3 is prevented from moving into the tapered portion 1b as the inner cylinder 2a projects into the tapered portion 1b. Its working effects will be explained below in reference to FIG. 4.

The outer cylinder 2b of the tube-shaped body 2 is provided with a pair of engagement slots 2d into which each of the convex engaging parts 1d of the joint main body 1 can be fit. The slots are arranged corresponding to the opposite pair of the convex engaging parts 1d at a position opposite each other on the outer periphery of the outer cylinder 2b as illustrated in FIG. 3(d). Each engagement slot 2d generally has a shape of a long bore arranged across about 90 degrees on the outer periphery of the outer cylinder 2b. The both ends of each bore are parallel to the direction orthogonal to the axial direction of the outer cylinder 2b and are connected each other with an oblique slot intersecting said parallel direction with an acute angle.

The engagement slot 2d has a width allowing the convex engaging part 1d to fit into the slot without backlash. At the tip side of each parallel end of the slots, a detent projection 2e is provided for narrowing the slot width of the engagement slot 2d at a position leaving a space for receiving the convex engaging part 1d. Outside the engagement slot 2d at the position of the detent projection 2e, a notch for deforming the projection 2f is arranged so as to allow the detent projection 2e appear and disappear from the slot.

With this configuration, by fitting the convex engaging part 1d of the joint main body 1 into the engagement slot 2d and by rotating the tube-shaped body 2 covering the exterior of the joint main body 1 in the circumferential direction, the engagement slot 2d of the tube-shaped body guides the tube-shaped body 2 in its axial direction so as to move between its first position and the second position relative to the joint main body 1, and it prevents the tube-shaped body 2 from rotating in the returning direction by means of the detent projection 2e at each parallel end portion of the engagement slot 2d for maintaining each position.

Though the detent projections 2e confine the rotation of the tube-shaped body 2 when being left, they allow the tube-shaped body 2 to rotate by the action of the notch for deforming the projection 2f if the tube-shaped body 2 is rotated intentionally.

Though a material for the tube-shaped body 2 is preferably polycarbonate (PC), it is not limited to PC, and any other synthetic resins having good weatherability, durability and formability may be used.

The retaining ring 3 is a rubber seal ring in shape, and is provided with a seal lip part 3a contacting with the pipe P inside and an outer peripheral ring part 3b which follows the other end of the tip lip of the seal lip part 3a and forming an outer periphery.

The seal lip part 3a has an inner diameter corresponding to the outer diameter of the pipe P, and may or may not have a sealing effect. It should be, however, arranged closely around the outer periphery of the pipe P so that the retaining ring 3 does not move relative to the pipe P and moves together with the latter, as long as the seal lip part 3a is inserted over the pipe P, if the retaining ring 3 is not shrunk radially from the outside and if a hand of the operator is away from the ring.

The retaining ring 3, on the other hand, is configured to confine the movement of the pipe P when the ring part 3b shrinks radially, in other words, exert an effect of retaining the pipe.

The retaining ring is not limited to a rubber seal ring 3, but may be any ring being arranged closely at the outer periphery of the pipe P and exerting retaining effect when it is shrunk radially, such as a so-called C-ring (which is a ring body out of a synthetic resin or a metal having a C-shaped cross-section in the direction orthogonal to the axis, i.e., having a partially cut cylindrical shape).

FIGS. 4(a), (b) and (c) are longitudinal cross-sectional views showing the various embodiments of use of the pipe joint of FIG. 1. Working effects featured by the pipe joint 5 having the above-mentioned configuration will be described below in reference to these figures. In the figures, the tube-shaped body 2 located in the first position is shown with the reference numeral 2(I), while the tube-shaped body 2 located in the second position is shown with the reference numeral 2(II). The tube-shaped body (I) in FIG. 1 is also located at the first position.

In FIG. 4(a), the tube-shaped body 2 (II) is positioned at the second position II where the peripheral edge of the inner cylinder 2a of the tube-shaped body 2 (II) is projected into the tapered portion 1b of the joint main body 1, so that the retaining ring 3 is confined at the peripheral edge of the inner cylinder 2a and is located in the receiving portion 1a of the joint main body 1, and thus the ring is not allowed to move into the tapered portion 1b. The retaining ring 3 thereby is positioned in the receiving portion 1a, not in a shrinking state, so that the pipe P can be inserted and detached.

Here the edge of the pipe P is contacted with the pipe-end stopping part 1e of joint main body 1, while the retaining ring 3 is confined with the ring catching part 1f. It can be thus confirmed that the seal lip part 3a of the retaining ring is contacted with the outer periphery of the pipe at a position being longitudinally spaced away from the pipe end (in the direction remote from the pipe end) with a distance corresponding to the length of ring catching part 1f (distance H1).

In FIG. 4(b) the tube-shaped body 2(I) is positioned at the first position I where the inner cylinder 2a is not projected into the tapered portion 1b, so that the retaining ring 3 is allowed to move into the tapered portion 1b. This position is obtained by rotating the tube-shaped body 2 being in the state of FIG. 4(a) after insertion of the pipe P so as to move the tube-shaped body 2 from the second position to the first position. The pipe may be maintained in the connected state with this state.

FIG. 4(c) shows a state where the pipe P is pulled up (direction viewed in the drawing) from the position shown in FIG. 4(b) with a distance H2 in order to detach the pipe P. Here, the pipe P and the retaining ring 3 are moved upward together, so that the retaining ring 3 is moved into the tapered portion 1b of joint main body 1, resulting in shrinkage. The retaining ring 3 thereby prevents the pipe P from being detached from the receiving opening 1c.

Suppose a case that the pipe P is not present in the case of FIG. 4(c), that the tube-shaped body 2(I) is in the first position, and that the retaining ring 3 is within the tapered portion 1b. If the pipe P is then inserted, the retaining ring 3 is moved together with the pipe P, so that the retaining ring 3 is positioned within the receiving portion 1a as shown in FIG. 4(b).

In summary, with this pipe joint 5, in the case that the tube-shaped body 2 is in the first position, and if the pipe P has been already inserted, the retaining effect of the pipe joint is exerted. If, on the other hand, the pipe P is newly inserted into the pipe joint, the pipe joint allows it to be inserted.

In other words, the configuration of the pipe joint 5 is featured as follows: a pipe can be inserted into the receiving opening 1c when the tube-shaped body 2 is both in the first position I and the second position II, where in the first position the pipe is prevented from being detached because the retaining ring 3 is moved into the tapered portion 1b together with the pipe P, while in the second position the pipe is allowed to be detached because the retaining ring 3 is not moved into the tapered portion 1b. A separate tool such as a driver is not required here.

The pipe joint 5 of the present invention allows a pipe to be inserted, detached and retained from being detached by simply operating the pipe joint itself without requiring a separate tool or the like.

As shown in FIG. 4, with this pipe joint 5, because of the ring catching part 1f, while the pipe P is inserted, the seal lip part 3a of the retaining ring 3 is contacted with the outer periphery of the pipe at a position longitudinally away from the pipe end with a distance of H1. Therefore, even if the pipe end is not cut precisely perpendicular to the axis of the pipe P, the insufficient contact of the pipe and the retaining ring does not occur and the sealing can be surely maintained.

In addition, the pipe joint 5 is configured to enable to keep a connecting state with the pipe P even if the pipe P is pulled up with a distance H2 as shown in FIG. 4(c), where the retaining ring 3 radially shrinks and exerts an effect for retaining. In this state, since the pipe P is located at a position keeping a gap of the distance H2 from the pipe-end stopping part 1e, even if the pipe P is expanded due to the increase of the temperature of the fluid within the pipe, the expansion of the pipe can be absorbed, so that a problem of the pipe expansion due to the increase of the temperature can be avoided.

If the pipe P shrinks from the state shown in FIG. 4(b), on the other hand, due to the decrease of the temperature of the fluid within the pipe, the pipe only achieves the statue shown in FIG. 4(c). The sealing and retaining condition can be even improved then due to the radial shrinking of the ring. If the pipe P is further shortened from the shrinking and retained state shown in FIG. 4(c) due to the decrease of the temperature of the fluid within the pipe, there is still a room between the retaining ring 3 and the tip of the tapered portion 1b of the joint main body 1 in the longitudinal direction. In addition, the further shrinking of the pipe P further increases the sealing and retaining of the ring, so that no problem is caused.

Furthermore, the retaining ring 3 moves between the receiving portion 1a and the tapered portion 1b of the receiving opening 1c of the joint main body 1 depending on the movement of the pipe P together with the pipe P, where the seal lip part 3a of the retaining ring 3 and the pipe P are contacted at a position away from the pipe end with a distance H1. Thus, even if a slight slip is caused in the movement of the ring together with the pipe, the seal lip part 3a is closely arranged on the entire outer periphery of the pipe P, so that the sealing between the retaining ring 3 and the pipe P can be preferably maintained.

To a portion of the outer periphery of the retaining ring 3 which is contacted with the inner periphery of the joint main body 1 and/or to a portion of the inner periphery of the joint main body 1 which is contacted with the outer periphery of the retaining ring 3, a lubricant may be applied or attached for improving a smooth sliding of the two elements relative to each other. The retaining ring 3 can thus be moved more smoothly relative to the joint main body 1 so that the retaining ring 3 is assured to move in the joint main body 1 followed by the pipe, to keep the pipe within the tapered portion 1b for preventing the pipe to be detached, and not to confine the pipe in the receiving portion 1a.

Though the lubricant desirably contains polytetrafluoroethylene (PTFE) or fluorine (F), it is not limited to them, and any lubricant may be used as far as it improves smooth sliding, keeps smooth sliding ability for a long time after its application or attachment and has good weatherablity.

Figure 5:
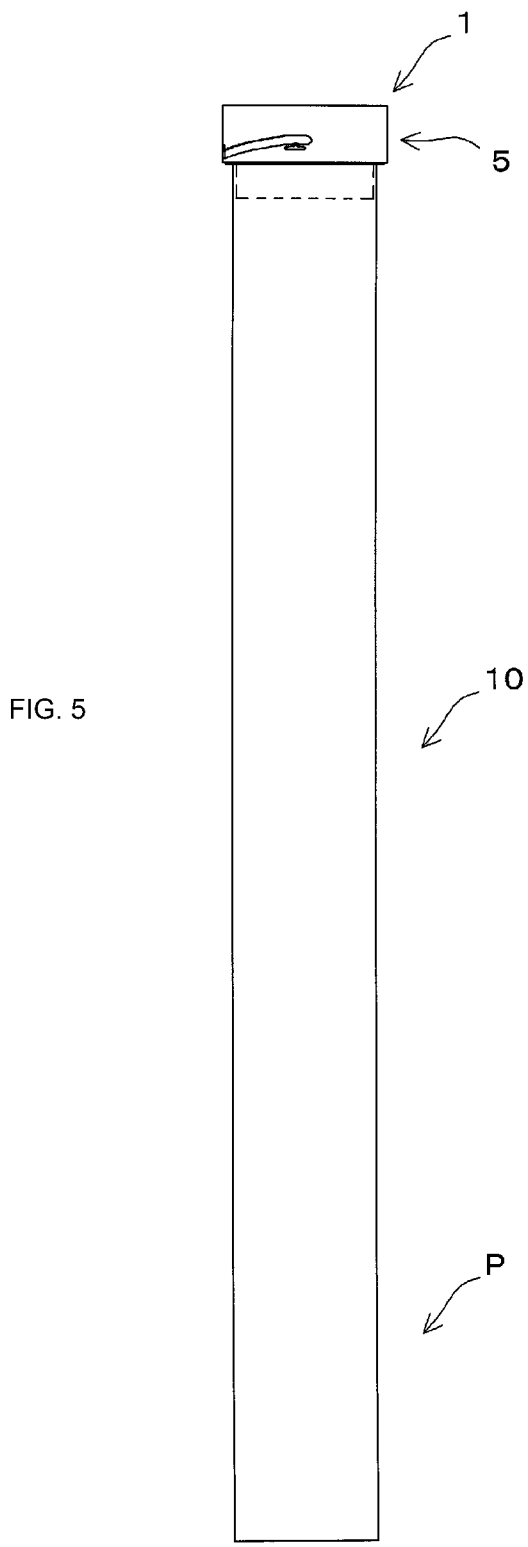
FIG. 5 shows an outside front view showing an example of a pipe equipped with a pipe joint of the present invention.

FIG. 5 shows an outside front view showing an example of a pipe equipped with a pipe joint of the present invention. The pipe equipped with the pipe joint 10 has a pipe joint 5 described in reference to FIGS. 1 through 4., where a pipe P having a predetermined length is fixedly joined by way of adhesion for example to a pipe junction part 1g of the pipe joint 5, so that an effect of the pipe joint 5 is exerted in the pipe equipped with the pipe joint 10.

A pipe channel is generally formed by subsequently connecting plurality of pipes such as a pipe equipped with a pipe joints 10, where an effort of fixedly joining one pipe P and the pipe joint on site can be saved.

Embodiment 2

Figure 6:
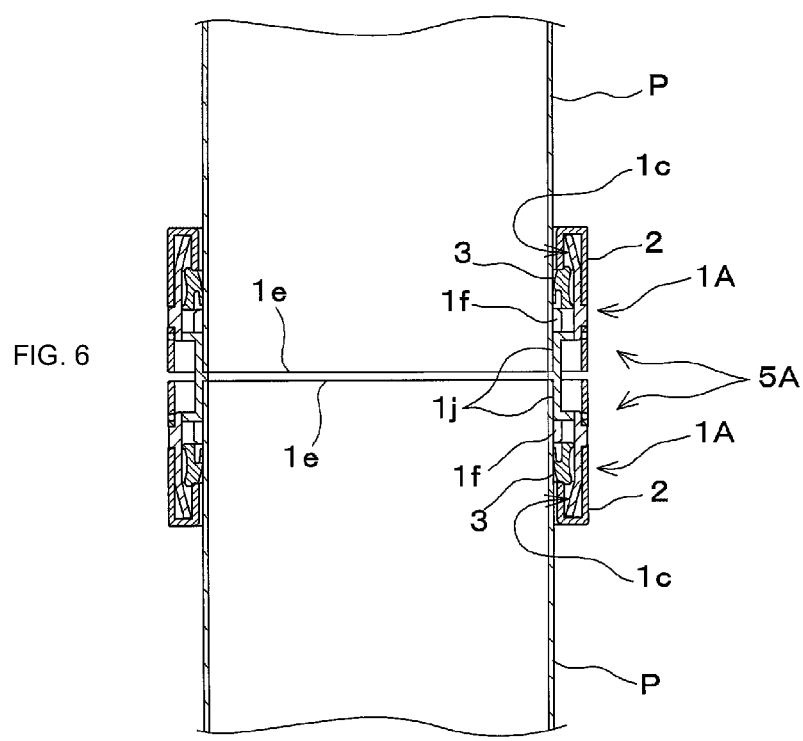
FIG. 6 shows another embodiment of a pipe joint of the present invention in a longitudinal cross-sectional view.

FIG. 6 shows another embodiment of the pipe joint of the present invention, which is shown only in part in the drawing.

This embodiment of the pipe joint 5A is only different from the pipe joint 5 of the FIG. 1 in that two joint main bodies 1A are connected by a connecting part 1j, and that two receiving openings 1c, two tube-shaped bodies 2 and two retaining rings 3 are provided in the opposite directions of the connecting part 1j being the center.

This pipe joint 5A thus allows two pipes P to be inserted, detached and retained from being detached on both ends by connecting the pipe joints 5 of FIG. 1 on both ends, so that the effect of the pipe joint 5 can be exerted on both ends by means of the pipe joint 5A when a pipe is connected to each receiving opening 1c.

Embodiment 3

Figure 7:
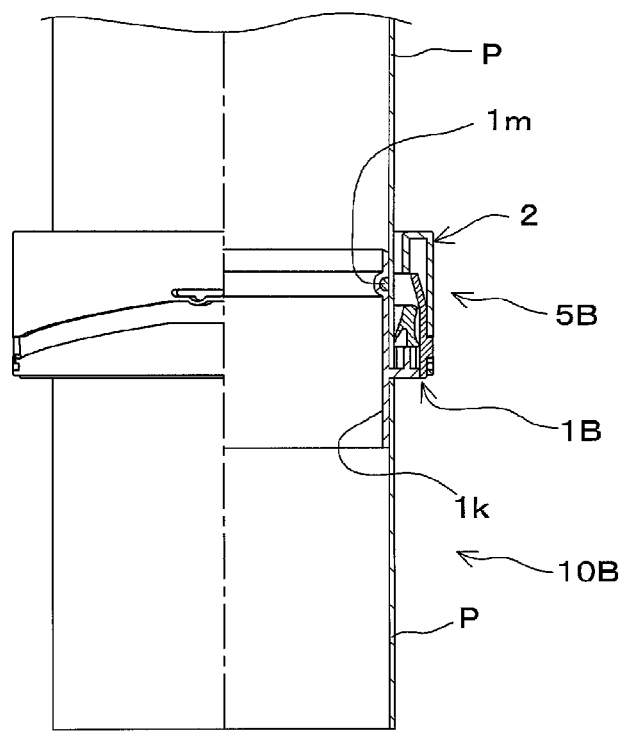
FIG. 7 shows another embodiment of a pipe joint of the present invention in a partial cross-sectional view.

FIG. 7 shows another embodiment of the pipe joint of the present invention in a partial cross-sectional view.

This embodiment of the pipe joint 5B is only different from the pipe joint 5 of the FIG. 1 in that a pipe junction part 1k of a joint main body 1B is fixedly joined with a pipe P on its outer periphery, and that the pipe junction part 1k has a sufficient length to be able to achieve the inner periphery of the other pipe P connected on the other side, and that an O-ring 1m can be fit in between the pipe junction part and the other pipe P connected on the other side.

This type of the pipe joint 5B and the pipe equipped with the pipe joint 10B not only exerts the same effect of the pipe joint 5 shown in FIG. 1 and the pipe equipped with the pipe joint 10 shown in FIG. 4, but also the sealing with respect to the inner periphery of the other pipe P can be increased.

The pipe joint and the pipe equipped with the pipe joint of the present invention is not limited to those shown in the above-mentioned embodiments. Rather, a number of variations, combinations within the scope of the claims and the embodiments are possible and included in the scope of the present invention.

For example, the convex engaging part for rotating the tube-shaped body may be provided on the tube-shaped body side, while the engaging slot may be provided on the joint main body side. Also, the method for moving the tube-shaped body in the axial direction does not need to use the exemplified oblique slot, but may employ a method for moving the tube-shaped body simply in the axial direction, a method using a Z shape slope, or a method combinedly using a male and a female screw.

The pipe joint and the pipe equipped with the pipe joint of the present invention can be used in the industrial field of forming pipe channels where a pipe is required to be able to be inserted, detached and retained from being detached by simply operating the pipe joint itself without requiring a separate tool or the like.

EXPLANATION OF REFERENCE LETTERS OR NUMERALS

P pipe
1 through 1B joint main body
1a receiving portion
1b tapered portion
1c receiving opening
1d convex engaging part
1e pipe-end stopping part
1f ring catching part
1h main-body outer part
1i main-body inner part
2 tube-shaped body
2a inner cylinder
2b outer cylinder
2c connecting part
2d engagement slot
3 retaining ring
5 through 5B pipe joint
10 through 10B pipe equipped with a pipe
I first position
II second position The foregoing has described a pipe joint and a pipe equipped with a pipe joint. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A pipe joint comprising:
    a joint main body provided with a receiving opening into which a pipe is inserted;
    a tube-shaped body mounted to said receiving opening and movably in the axial direction of said joint main body; and
    a retaining ring being closely arranged to an outer surface of the pipe inserted into the receiving opening for preventing the pipe from being detached from said receiving opening by radial shrinkage, wherein said retaining ring is a rubber seal ring,
    wherein said joint main body is composed of a receiving portion for receiving said retaining ring, and a tapered portion for radially shrinking said retaining ring when said retaining ring is moved toward a tip side of said receiving portion,
    wherein said tube-shaped body is provided with an inner cylinder inserted into an inner surface of the receiving opening, and is arranged to move reciprocatively between a first position where said retaining ring is allowed to move into said tapered portion without said inner cylinder projecting into said tapered portion, and a second position where said retaining ring is prevented from moving into said tapered portion as a peripheral end of said inner cylinder projects into said tapered portion, and
    wherein said pipe joint is configured so as that the pipe can be inserted into said receiving opening when said tube-shaped body is both in the first and the second position, that in said first position said retaining ring moves together with the pipe into said tapered portion for preventing the pipe from being detached, and that in said second position the pipe is allowed to be detached without said retaining ring moving into said tapered portion.

2. A pipe joint according to claim 1, wherein the joint main body is provided with a ring catching part residing in a remote end of said receiving portion and confining the movement of said retaining ring together with the pipe, and a pipe-end stopping part residing more remotely than said ring catching part and abutting on the pipe end when the pipe is inserted, wherein said retaining ring is positioned at a position away from the pipe end with a distance corresponding to a length of said ring catching part when the pipe is inserted,
    wherein the joint main body is composed of a transparent or a semi-transparent material at least between said pipe-end stopping part and said ring catching part so that an inserted pipe can be recognized from the outside there.

3. A pipe joint according to claim 2, said joint main body and said tube-shaped body are configured to be engaged by way of a convex engaging part and an engagement slot,
    wherein said engagement slot guides said tube-shaped body so as to move it in the axial direction of said joint main body by rotating said tube-shaped body in the circumferential direction.

4. A pipe joint according to claim 1, wherein a lubricant is applied or attached to at least one of: (a) a portion of an outer periphery of said retaining ring which is contacted with an inner periphery of said joint main body and (b) a portion of an inner periphery of the joint main body which is contacted with the outer periphery of said retaining ring so as to improve a smooth sliding of the joint main body relative to the retaining ring.

5. A pipe joint according to claim 4, said joint main body and said tube-shaped body are configured to be engaged by way of a convex engaging part and an engagement slot,
    wherein said engagement slot guides said tube-shaped body so as to move it in the axial direction of said joint main body by rotating said tube-shaped body in the circumferential direction.

6. A pipe joint according to claim 1, said joint main body and said tube-shaped body are configured to be engaged by way of a convex engaging part and an engagement slot,
    wherein said engagement slot guides said tube-shaped body so as to move it in the axial direction of said joint main body by rotating said tube-shaped body in the circumferential direction.

7. A pipe equipped with a pipe joint, comprising a pipe joint according to one of the preceding claims, and a pipe connected to an opposite side to the receiving opening of said pipe joint.

8. A pipe joint comprising:
- a joint main body provided with a receiving opening for receiving a pipe therein;
- a tube-shaped body mounted to said receiving opening and movable in the axial direction of said joint main body; and
- a retaining ring disposed within the main joint body, wherein said retaining ring is a rubber seal ring;
- wherein said joint main body comprises a receiving portion that receives said retaining ring, and a tapered portion disposed axially adjacent to the receiving portion, wherein the tapered portion is configured so as to radially shrink said retaining ring in response to said retaining ring being moved into said tapered portion; and
- wherein said tube-shaped body is provided with an inner cylinder inserted into the receiving opening, and is arranged to move reciprocatively between a first position where said inner cylinder does not project into said tapered portion, and said retaining ring is free to move into said tapered portion, and a second position where a peripheral end of said inner cylinder projects into said tapered portion so as to block said retaining ring from moving into said tapered portion.

* * * * *